(12) United States Patent
Wang et al.

(10) Patent No.: US 12,005,393 B2
(45) Date of Patent: Jun. 11, 2024

(54) FLUE GAS LOW-TEMPERATURE ADSORPTION DENITRATION SYSTEM AND PROCESS

(71) Applicant: HUANENG CLEAN ENERGY RESEARCH INSTITUTE, Beijing (CN)

(72) Inventors: Shiqing Wang, Beijing (CN); Qixiang Fan, Beijing (CN); Shisen Xu, Beijing (CN); Shiwang Gao, Beijing (CN); Shaomin Wang, Beijing (CN); He Zhao, Beijing (CN); Minhua Jiang, Beijing (CN); Ping Xiao, Beijing (CN); Bin Huang, Beijing (CN); Hongwei Niu, Beijing (CN); Jinyi Wang, Beijing (CN); Lianbo Liu, Beijing (CN)

(73) Assignee: HUANENG CLEAN ENERGY RESEARCH INSTITUTE, Beijing (CN)

( * ) Notice: Subject to any disclaimer, the term of this patent is extended or adjusted under 35 U.S.C. 154(b) by 555 days.

(21) Appl. No.: 17/239,662

(22) Filed: Apr. 25, 2021

(65) Prior Publication Data

US 2021/0245096 A1  Aug. 12, 2021

Related U.S. Application Data

(63) Continuation of application No. PCT/CN2020/076850, filed on Feb. 26, 2020.

(30) Foreign Application Priority Data

Oct. 29, 2019 (CN) .......................... 201911039134.3

(51) Int. Cl.
*B01D 53/56* (2006.01)
*B01D 53/04* (2006.01)
*B01D 53/26* (2006.01)

(52) U.S. Cl.
CPC ......... *B01D 53/56* (2013.01); *B01D 53/0462* (2013.01); *B01D 53/265* (2013.01);
(Continued)

(58) Field of Classification Search
None
See application file for complete search history.

(56) References Cited

U.S. PATENT DOCUMENTS 3,808,773 A * 5/1974 Reyhing ............ B01D 53/0462
95/123
2014/0090415 A1 * 4/2014 Reddy .................. B01D 53/265
62/602

FOREIGN PATENT DOCUMENTS

CN    101325996 A    12/2008
CN    108310968 A  *  7/2018    ............. B01D 53/56
(Continued)

OTHER PUBLICATIONS

English language machine translation for CN 108310968 A. Retrieved from translationportal.epo.org on Nov. 8, 2023. (Year: 2023).*
(Continued)

*Primary Examiner* — Jason M Greene
(74) *Attorney, Agent, or Firm* — W&G Law Group

(57) ABSTRACT

Disclosed is a flue gas low-temperature adsorption denitration system and process. The system includes a booster fan, a cold energy recoverer, a flue gas cooling system, a flue gas switching valve, and two denitration adsorption towers. An inlet of the booster fan is in communication with an inlet flue gas pipeline. The booster fan, the cold energy recoverer, the flue gas cooling system, the flue gas switching valve, and the denitration adsorption towers are sequentially communicated. An outlet of the flue gas switching valve is in communication with each of the two second denitration adsorption towers. Flue gas outlets of the two denitration adsorption towers are in communication with a flue gas
(Continued)

manifold. The flue gas manifold is communicated with the cold quantity recoverer. Two denitration adsorption towers take turns to carry out denitration and regeneration processes, so that continuous denitration operations of the system can be achieved.

7 Claims, 1 Drawing Sheet

(52) U.S. Cl.
CPC .. *B01D 2253/102* (2013.01); *B01D 2257/404* (2013.01); *B01D 2257/80* (2013.01); *B01D 2258/0283* (2013.01); *B01D 2259/40003* (2013.01)

(56) References Cited

FOREIGN PATENT DOCUMENTS

| | | | | |
|---|---|---|---|---|
| CN | 109806742 A | * | 5/2019 | ............. B01D 53/04 |
| CN | 110743312 A | | 2/2020 | |
| CN | 110743313 A | | 2/2020 | |
| JP | H05146633 A | | 6/1993 | |

OTHER PUBLICATIONS

English language machine translation for CN 109806742 A. Retrieved from translationportal.epo.org on Nov. 8, 2023. (Year: 2023).*
International Search Report (PCT/CN2020/076850); dated Jul. 29, 2020.

* cited by examiner

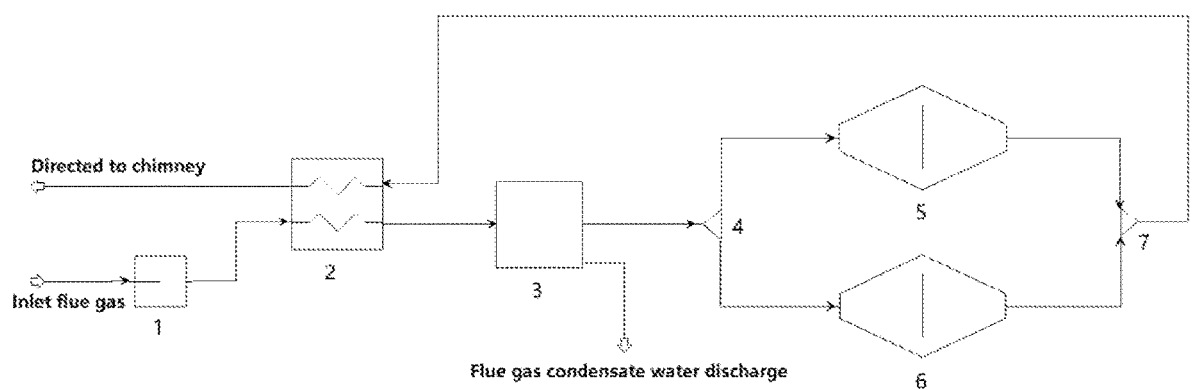

FLUE GAS LOW-TEMPERATURE ADSORPTION DENITRATION SYSTEM AND PROCESS

TECHNICAL FIELD

The present disclosure relates to the technical field of flue gas denitration, and in particular, to a flue gas low-temperature adsorption denitration system and process.

BACKGROUND

Flue gas produced by coal burning contains a large amount of NOx, which is one of the main causes of air pollution. At present, NOx in flue gas is mainly removed with an SCR selective catalytic reduction method. In this method, NOx is reduced to harmless $N_2$ by adding NH 3 of flue gas under the action of a catalyst, and then removed. Although SCR denitration technology is quite mature at present, there are still many problems. For example, the catalyst has high activity only within a specific temperature range. When an operation load of a power plant is adjusted, a change in the temperature of the flue gas may seriously affect the SCR denitration efficiency. In addition, SCR denitration may lead to secondary pollution such as ammonia escape and solid waste of catalysts, and aging and consumption of denitration catalyst can be quite fast, thereby resulting in a high operation cost. In addition to the SCR selective reduction method, there is wet denitration technology, but it needs to first oxidize insoluble NO gas in NOx into soluble NO 2 acid gas, and then remove it by a absorption function of an alkaline liquid. Common pre-oxidation methods include an ozone method, a hydrogen peroxide method, a catalyst oxidation method, a low-temperature plasma oxidation method, and the like. The ozone method and the hydrogen peroxide method need to consume an extra strong oxidant, have a high operation cost, and may lead to secondary pollution discharge. The catalyst oxidation method requires a practical noble metal catalyst with a high price, and thus is difficult to be applied to industrialization. The low-temperature plasma oxidation method leads to high power consumption, thereby resulting in a high operation cost.

SUMMARY

In order to solve the problems existing in the prior art, the present disclosure provides a flue gas low-temperature adsorption denitration system and process, which can not only adsorb and remove the component $NO_2$ in NOx that is easy to be adsorbed, but also effectively adsorb the component NO in NOx that is difficult to be adsorbed, so as to reduce the cost of denitration and not bring about secondary pollution caused by excessive ammonia during the SCR process.

In order to achieve the above objectives, the present disclosure provides the following technical solution. A flue gas low-temperature adsorption denitration system includes a booster fan, a cold energy recoverer, a flue gas cooling system, a flue gas switching valve, a first denitration adsorption tower, and a second denitration adsorption tower.

An inlet of the booster fan is in communication with an inlet flue gas pipeline, an outlet of the booster fan is in communication with a hot-side inlet of the cold energy recoverer, a hot-side outlet of the cold energy recoverer is in communication with an inlet of the flue gas cooling system, a flue gas outlet of the flue gas cooling system is in communication with an inlet of the flue gas switching valve, an outlet of the flue gas switching valve is respectively in communication with a flue gas inlet of the first denitration adsorption tower and a flue inlet of the second denitration adsorption tower, a flue gas manifold is provided on the flue gas pipeline leading to the cold energy recoverer, a flue gas outlet of the first denitration adsorption tower and a flue outlet of the second denitration adsorption tower are in communication with an inlet of the flue gas manifold, and an outlet of the flue gas manifold is in communication with a cold-side inlet of the cold energy recoverer.

The flue gas cooling system includes a primary cooling system and a secondary cooling system; the primary cooling system is an air cooling system, a heat exchanger cooling system, or a water cooling system; the secondary cooling system is a compression refrigeration system or an absorption refrigeration system; and the flue gas cooling system is provided with a flue gas condensate water outlet, and the flue gas condensate water outlet is in communication with a water inlet of a water treatment system.

Each of the first denitration adsorption tower and the second denitration adsorption tower is a fixed-bed adsorption tower, with a fixed bed being filled with a NOx adsorption material.

The NOx adsorption material is activated carbon or molecular sieve.

An outer side of each of the first denitration adsorption tower and the second denitration adsorption tower is well thermal insulated to reduce cold energy loss.

The flue gas switching valve is an electric or pneumatic switching valve; and an input end of a controller of the flue gas switching valve is connected to an output end of a DCS in a factory region.

The cold energy recoverer is a flue gas heat exchanger.

A flue gas low-temperature denitration process is provided. After flue gas upon dust removal and desulfurization is pressurized, the flue gas is pre-cooled and then cooled to below room temperature; the flue gas with a temperature below the room temperature enters a denitration adsorption tower for physical adsorption denitration in the denitration adsorption tower; the flue gas upon dust removal and desulfurization is pre-cooled with the flue gas after denitration; and clean flue gas that absorbs heat enters a chimney for discharge.

Denitration is carried out by using the system described above, the flue gas upon dust removal and desulfurization enters the fan for pressurization and then enters the cold energy recoverer to exchange heat with the low-temperature clean flue gas after denitration to achieve pre-cooling; the pre-cooled flue gas enters the flue gas cooling system for cooling, so as to obtain cooled flue gas with a temperature below the room temperature; the cooled flue gas passes the flue gas switching valve and then enters the first denitration adsorption tower or the second denitration adsorption tower; the first denitration adsorption tower and the second denitration adsorption tower take turns to carry out adsorption denitration and regeneration processes; clean flue gas after adsorption denitration enters the flue gas manifold and then enters the cold energy recoverer for cold energy recovery; and the clean flue gas after being heated enters the chimney for discharge.

In the flue gas cooling system, primary cooling of the flue gas is carried out by circulating cooling water heat exchange cooling or spray cooling, and secondary cooling of the flue gas after primary cooling is carried out by compression refrigeration or absorption refrigeration.

Compared with the prior art, the present disclosure has at least the following beneficial effects: the flue gas low-temperature adsorption denitration system of the present disclosure is provided with a flue gas cold energy recoverer, which can pre-cool flue gas after desulfurization by using low-temperature clean flue gas, can improve the utilization of cold energy of the system, and is conducive to rapid discharge of the clean flue gas; the system is provided with two denitration adsorption towers, which take turns to carry out denitration and regeneration processes, so that continuous denitration operations of the system can be achieved, the denitration efficiency is high, and the adsorption material is recycled after desorption. The denitration system is arranged following dust removal and desulfurization, and denitration is carried out after the temperature of the flue gas is reduced to below room temperature. The equipment following the flue gas cooling system does not need a high-temperature resistant equipment, which can reduce the cost.

$NO_2$ and NO are directly adsorbed and removed by physical adsorption and denitration at the same time, without the need for pre-oxidation of NO. The denitration efficiency is high, and zero discharge of NOx can be achieved. The adsorbed NOx is desorbed in the form of $NO_2$ and can be then collected for producing high value-added by-products such as nitric acid or nitrogen fertilizer. A large amount of acid condensate water precipitates in the process of flue gas cooling, and can be used by the power plant after neutralization treatment to reduce water consumption of the power plant. The process adopts a physical method for denitration, without the use of a denitration catalyst, reducing agent or oxidant and other chemicals, thereby reducing the operation cost, reducing ammonia escape and other secondary pollution, and can achieve recycling of water resource.

BRIEF DESCRIPTION OF DRAWINGS

FIG. 1 is a schematic diagram of a process according to the present disclosure.

1: booster fan; 2: cold energy recoverer; 3: flue gas cooling system; 4: flue gas switching valve; 5: first denitration adsorption tower; 6: second denitration adsorption tower; 7: flue gas manifold.

The accompanying drawings of the specification are used for providing further illustration of the present disclosure and constitute a part of the present disclosure. Schematic embodiments of the present disclosure and the description thereof are used for explaining the present disclosure and do not constitute improper limitations on the present disclosure.

DESCRIPTION OF EMBODIMENTS

In order to clearly illustrate the present disclosure, the present disclosure is described in further detail below with reference to embodiments and the drawings. Those skilled in the art shall understand that the following is not a limitation on the protection scope of the present disclosure, and any improvement or change made on the basis of the present disclosure falls within the protection scope of the present disclosure.

Referring to FIG. 1, a flue gas low-temperature adsorption denitration system includes a booster fan 1, a cold energy recoverer 2, a flue gas cooling system 3, a flue gas switching valve 4, a first denitration adsorption tower 5, and a second denitration adsorption tower 6. An inlet of the booster fan 1 is in communication with an inlet flue gas pipeline, an outlet of the booster fan 1 is in communication with a hot-side inlet of the cold energy recoverer 2, a hot-side outlet of the cold energy recoverer 2 is in communication with an inlet of the flue gas cooling system 3, a flue gas outlet of the flue gas cooling system 3 is in communication with an inlet of the flue gas switching valve 4, an outlet of the flue gas switching valve 4 is respectively in communication with a flue gas inlet of the first denitration adsorption tower 5 and a flue gas inlet of the second denitration adsorption tower 6, the flue gas pipeline leading to the cold energy recoverer 2 is provided with a flue gas manifold 7, a flue gas outlet of the first denitration adsorption tower 5 and a flue gas outlet of the second denitration adsorption tower 6 are in communication with an inlet of the flue gas manifold 7, and an outlet of the flue gas manifold 7 is in communication with a cold-side inlet of the cold energy recoverer 2.

The flue gas cooling system 3 includes a primary cooling system and a secondary cooling system. The primary cooling system is an air cooling system, a heat exchanger cooling system, or a water cooling system; and the secondary cooling system is a compression refrigeration system or an absorption refrigeration system. The flue gas cooling system 3 is provided with a flue gas condensate water outlet, and the flue gas condensate water outlet is in communication with a water inlet of a water treatment system.

The denitration adsorption tower is a fixed-bed adsorption tower, with a fixed bed being filled with a NOx adsorption material. The NOx adsorption material is activated carbon or molecular sieve.

An outer side of the adsorption tower is well thermal insulated to reduce cold energy loss. The cold energy recoverer 2 is a flue gas heat exchanger.

The flue gas switching valve 4 is an electric or pneumatic switching valve; and an input end of a controller of the flue gas switching valve 4 is connected to an output end of a DCS in a factory region.

A flue gas low-temperature denitration process is provided. After the flue gas upon dust removal and desulfurization is pressurized, the temperature of the flue gas is pre-cooled and then cooled to below room temperature, the flue gas with a temperature below the room temperature enters a denitration adsorption tower for physical adsorption denitration in the denitration adsorption tower, the flue gas upon dust removal and desulfurization is pre-cooled with the flue gas after denitration, and clean flue gas that absorbs heat enters a chimney for discharge.

Denitration is carried out by using the system described above, the flue gas upon dust removal and desulfurization enters the fan 1 for pressurization and then enters the cold energy recoverer 2 to exchange heat with the low-temperature clean flue gas after denitration, so as to achieve pre-cooling. The pre-cooled flue gas enters the flue gas cooling system 3 for cooling, so as to obtain cooled flue gas with a temperature below the room temperature, and the cooled flue gas passes the flue gas switching valve 4 and then enters the first denitration adsorption tower 5 or the second denitration adsorption tower 6. The first denitration adsorption tower 5 and the second denitration adsorption tower 6 take turns to carry out adsorption denitration and regeneration processes, the clean flue gas after adsorption denitration enters the flue gas manifold 7 and then enters the cold energy recoverer 2 for cold energy recovery, and the clean flue gas after being heated enters the chimney for discharge.

In the flue gas cooling system 3, primary cooling of the flue gas is carried out by circulating cooling water heat exchange cooling or spray cooling, and secondary cooling of the flue gas after primary cooling is carried by compression refrigeration or absorption refrigeration.

Specific embodiments of the flue gas low-temperature adsorption denitration system and process according to the present disclosure are as follows.

A principle of adsorption denitration of the process according to the present disclosure is as follows.

1. $NO_2$ removal by adsorption in NOx: $NO_2$ is an easily adsorbed gas. When flue gas flows through a surface of activated carbon, molecular sieve or other porous adsorption material, $NO_2$ is directly adsorbed and removed.
2. NO removal by adsorption in NOx: NO is a gas extremely difficult to be adsorbed. When the flue gas flows through a surface of activated carbon, molecular sieve or other porous adsorption material, NO cannot be directly adsorbed and removed, but can be removed through the following steps.

At step (1), the flue gas is cooled to below room temperature by cooling.

At step (2), $O_2$ and NO in the low-temperature flue gas is enriched on the surface of the porous adsorption material when flowing through the surface of the porous adsorption material, which greatly increases the concentration of NO and $O_2$, thus rapidly oxidizing NO to $NO_2$.

At step (3), the oxidized $NO_2$ is adsorbed on the surface of the porous material.

The step (2) and step (3) are performed at the same time, and low-temperature removal of NO by adsorption is manifested as a whole. The step (1) in which the flue gas is cooled is a necessary condition to achieve the catalytic oxidation and adsorption of NO over adsorbent.

Regeneration of NOx: NO and $NO_2$ in NOx are adsorbed on the surface of the porous material in the form of $NO_2$; the porous material desorbs the adsorbed $NO_2$ by means of heating up, depressurizing, and microwave regeneration to recover adsorption performance and recycle it; and the desorbed $NO_2$ can be recycled to make nitric acid or nitrogen fertilizers.

The flue gas low-temperature adsorption denitration system according to the present disclosure includes a booster fan 1, a cold energy recoverer 2, a flue gas cooling system 3, a flue gas switching valve 4, a first denitration adsorption tower 5, and a second denitration adsorption tower 6. The booster fan 1 is used for overcoming flue gas resistance generated by the system and increasing a pressure of flue gas. The cold energy recoverer 2 includes a gas-gas or gas-liquid indirect heat exchanger. The cold energy recoverer can also adopt a direct-spraying packed tower or plate tower to recover cold energy of the clean flue gas after low temperature denitration, and the inlet flue gas in pre-cooled at the same time.

The flue gas switching valve 4 automatically switches a flue gas flow to the first denitration adsorption tower 5 or the second denitration adsorption tower 6 according to a set switching condition.

The first denitration adsorption tower 5 and the second denitration adsorption tower 6 are fixed-bed adsorption towers, filled with activated carbon, molecular sieve, activated coke, silica gel, activated alumina, and other adsorption materials. The adsorption tower is well thermal insulated to reduce heat dissipation loss of low-temperature flue gas. The two adsorption towers are periodically switched to maintain continuous operation of flue gas adsorption and denitration.

The flue gas manifold 7 is used for collecting the flue gas from the denitration adsorption tower into a clean flue gas pipeline for discharge.

An inlet of the booster fan 1 is in communication with an inlet flue gas pipeline. An outlet of the booster fan 1 is in communication with a hot-side inlet of the cold energy recoverer 2. A hot-side outlet of the cold energy recoverer 2 is in communication with an inlet of the flue gas cooling system 3. A flue gas outlet of the flue gas cooling system 3 is in communication with an inlet of the flue gas switching valve 4. An outlet of the flue gas switching valve 4 is respectively in communication with a flue gas inlet of the first denitration adsorption tower 5 and a flue inlet of the second denitration adsorption tower 6. A flue gas outlet of the first denitration adsorption tower 5 and a flue gas outlet of the second denitration adsorption tower 6 are in communication with an inlet of the flue gas manifold 7. An outlet of the flue gas manifold 7 is in communication with a cold-side inlet of the cold energy recoverer 2. A cold-side outlet of the cold energy recoverer 2 is in communication with a pipeline that goes to a power plant chimney.

The technological process of the present disclosure is as follows.

Boiler flue gas without denitration, after dust removal and desulfurization and heat recovery by an air preheater, is introduced into the system by the fan 1. High-temperature flue gas after being pressurized by the fan 1 flows through the cold energy recoverer 2, and exchanges heat with low-temperature clean flue gas after denitration, and cold energy of low-temperature flue gas is recovered. The flue gas after being pre-cooled by the cold energy recoverer 2 enters the flue gas cooling system 3, the flue gas is cooled below room temperature through multi-stage cooling such as cooling by circulating cooling water and cooling by industrial cooling water units, and condensate water is separated from the flue gas. After cooling and dehumidification, the flue gas passes the flue gas switching valve 4 and is guided into the first denitration adsorption tower 5 or the second denitration adsorption tower 6. The two adsorption towers take turns to carry out adsorption and regeneration operations to achieve continuous denitration of the flue gas. The clean flue gas after adsorption and denitration passes the flue gas manifold 7 and enters the cold side of the cold energy recoverer 2 for cold energy recovery, and the inlet flue gas is pre-cooled at the same time. The clean flue gas after cold energy recovery is discharged from the cold energy recoverer 2 and enters the power plant chimney.

After dust removal and desulfurization, flue gas of a 600-MW coal-fired or gas-fired unit enters the system of the present disclosure. After being pressurized by the booster fan 1, the flue gas enters the cold energy recoverer 2 and exchanges heat with low-temperature clean flue gas of 2° C., and the temperature drops from 50° C. to 35° C. The flue gas is further cooled to 2° C. by a low-temperature chiller after passing the flue gas cooling system 3, and flue gas condensate water is discharged from the flue gas cooling system. The cooled flue gas passes the flue gas switching valve 4 and enters the denitration adsorption tower 5. After adsorption and denitration, the clean flue gas flows through the flue gas manifold 7 and enters the cold side of the cold energy recoverer 2. After heat exchange with the flue gas after desulfurization, the temperature rises to 30° C. and the flue gas is discharged into the chimney. After being adsorbed by the first denitration adsorption tower 5 for 8 hours, adsorption and denitration is carried out by switching to the second denitration adsorption tower 6, and the first denitration adsorption tower 5 is switched to a heating regeneration mode, so as to desorb the adsorbed NOx. The first denitration adsorption tower 5 carries out regeneration for 4 hours and cooling for 4 hours, and then is re-switched to an adsorption mode. At the same time, the second denitration adsorption tower 6 is switched to a regeneration mode. A cycle repeats in this way, so as to achieve continuous adsorption denitration. The first denitration adsorption tower 5 and the second nitrate adsorption tower 6 are each filled with 500 tons of activated carbon. The desorbed NOx exists in the form of $NO_2$, which can be made into dilute nitric acid by an acid-making process, or be made into ammonium nitrate (nitrogen fertilizers) by ammonia water absorption, for recycling.

What is claimed is:

1. A flue gas adsorption denitration system, comprising a booster fan (1), a cold energy recoverer (2), a flue gas cooling system (3), a flue gas switching valve (4), a first denitration adsorption tower (5), and a second denitration adsorption tower (6), wherein the flue gas cooling system (3) cools flue gas to a temperature below 25° C., an inlet of the booster fan (1) is in communication with an inlet flue gas pipeline, an outlet of the booster fan (1) is in communication with a hot-side inlet of the cold energy recoverer (2), a hot-side outlet of the cold energy recoverer (2) is in communication with an inlet of the flue gas cooling system (3), a flue gas outlet of the flue gas cooling system (3) is in communication with an inlet of the flue gas switching valve (4), an outlet of the flue gas switching valve (4) is respectively in communication with a flue gas inlet of the first denitration adsorption tower (5) and a flue gas inlet of the second denitration adsorption tower (6), a flue gas manifold (7) is provided on a flue gas pipeline leading to the cold energy recoverer (2), a flue gas outlet of the first denitration adsorption tower (5) and a flue gas outlet of the second denitration adsorption tower (6) are in communication with an inlet of the flue gas manifold (7), and an outlet of the flue gas manifold (7) is in communication with a cold-side inlet of the cold energy recoverer (2), wherein the flue gas cooling system (3) comprises a primary cooling system and a secondary cooling system; the primary cooling system is an air cooling system, a heat exchanger cooling system, or a water cooling system; the secondary cooling system is a compression refrigeration system or an absorption refrigeration system; and the flue gas cooling system (3) is provided with a flue gas condensate water outlet, and the flue gas condensate water outlet is in communication with a water inlet of a water treatment system.

2. The flue gas adsorption denitration system according to claim 1, wherein each of the first denitration adsorption tower and the second denitration adsorption tower is a fixed-bed adsorption tower, with a fixed bed being filled with a NOx adsorption material.

3. The flue gas adsorption denitration system according to claim 2, wherein the NOx adsorption material is activated carbon or molecular sieve.

4. The flue gas adsorption denitration system according to claim 1, wherein an outer side of each of the first denitration adsorption tower and the second denitration adsorption tower is well thermal insulated to reduce cold energy loss.

5. The flue gas adsorption denitration system according to claim 1, wherein the flue gas switching valve (4) is an electric or pneumatic switching valve; and an input end of a controller of the flue gas switching valve (4) is connected to an output end of a DCS in a factory region.

6. The flue gas adsorption denitration system according to claim 1, wherein the cold energy recoverer (2) is a flue gas heat exchanger.

7. A flue gas denitration process, wherein after flue gas upon dust removal and desulfurization is pressurized, the flue gas is pre-cooled and then cooled to a temperature below 25° C.; the flue gas with the temperature below 25° C. enters a denitration adsorption tower for physical adsorption denitration in the denitration adsorption tower; the flue gas upon dust removal and desulfurization is pre-cooled with the flue gas after denitration; and clean flue gas that absorbs heat enters a chimney for discharge, wherein denitration is carried out by using the system according to claim 1, the flue gas upon dust removal and desulfurization enters the fan (1) for pressurization and then enters the cold energy recoverer (2) to exchange heat with the clean flue gas after denitration to achieve pre-cooling; the pre-cooled flue gas enters the flue gas cooling system (3) for cooling, so as to obtain cooled flue gas with the temperature below 25° C.; the cooled flue gas passes the flue gas switching valve (4) and then enters the first denitration adsorption tower (5) or the second denitration adsorption tower (6); the first denitration adsorption tower (5) and the second denitration adsorption tower (6) take turns to carry out adsorption denitration and regeneration processes; clean flue gas after adsorption denitration enters the flue gas manifold (7) and then enters the cold energy recoverer (2) for cold energy recovery; and the clean flue gas after being heated enters the chimney for discharge, and in the flue gas cooling system (3), primary cooling of the flue gas is carried out by circulating cooling water heat exchange cooling or spray cooling, and secondary cooling of the flue gas after primary cooling is carried out by compression refrigeration or absorption refrigeration.

\* \* \* \* \*